R. G. LEDIG.
ADJUSTABLE HANDLE BAR FOR VELOCIPEDES.
APPLICATION FILED APR. 11, 1919.
1,320,070.
Patented Oct. 28, 1919.
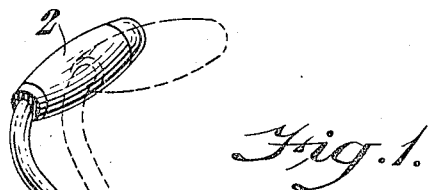
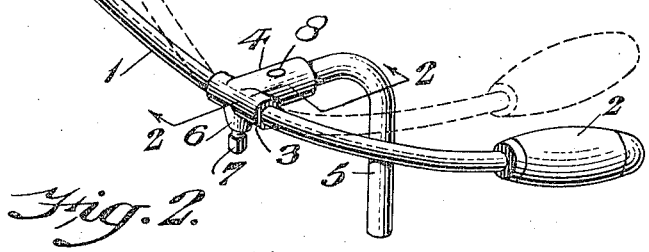
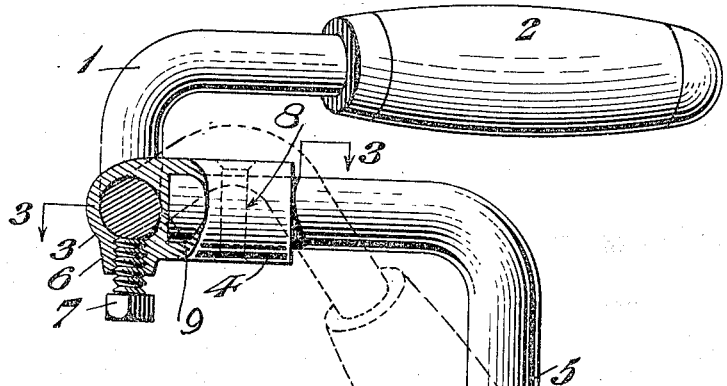
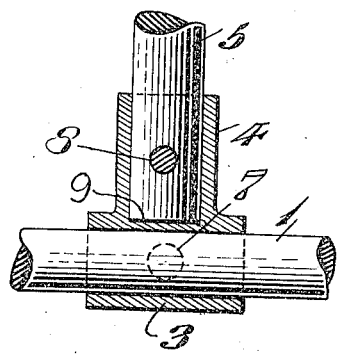
INVENTOR:
Richard G. Ledig.
BY Wiedersheim & Fairbanks
ATTORNEYS.

UNITED STATES PATENT OFFICE.

RICHARD G. LEDIG, OF PHILADELPHIA, PENNSYLVANIA, ASSIGNOR TO A. MECKY COMPANY, OF PHILADELPHIA, PENNSYLVANIA, A CORPORATION OF PENNSYLVANIA.

ADJUSTABLE HANDLE-BAR FOR VELOCIPEDES.

1,320,070.　　　　　Specification of Letters Patent.　　　Patented Oct. 28, 1919.

Application filed April 11, 1919. Serial No. 289,209.

*To all whom it may concern:*

Be it known that I, RICHARD G. LEDIG, a citizen of the United States, residing in the city and county of Philadelphia, State of Pennsylvania, have invented a new and useful Adjustable Handle-Bar for Velocipedes, of which the following is a specification.

My invention consists of a handle bar for a velocipede or like vehicle, the same being so mounted that it may be raised or lowered to a vertically adjustable position as may be desired by the rider, and then controlled against rotation thereby preserving its adjustment.

The invention is satisfactorily illustrated in the accompanying drawing, but the important instrumentalities thereof may be varied and so it is to be understood that the invention is not limited to the specific details shown and described, as long as they are within the spirit or scope of the claims.

Figure 1 represents a perspective view of an adjustable handle bar for a velocipede embodying my invention.

Fig. 2 represents a partial side elevation and partial vertical section thereof on an enlarged scale, on line 2—2 Fig. 1.

Fig. 3 represents a partial plan view and a partial horizontal section on line 3—3 Fig. 2.

Similar numerals of reference indicate corresponding parts in the figures.

Referring to the drawings.

1 designates the handle bar of a velocipede, the same being provided with the grips 2 usual in such cases.

3 designates a horizontally and transversely extending tubular head in which the central portion of said handle bar is freely journaled, so that the bar may be turned so as to be raised and lowered, and thus adjusted to the requirements of the rider of the velocipede.

On the rear portion of said head is the tubular neck 4 with which the upper terminal end portion of the steering post 5 of the velocipede is connected. On the inner side of said head is the tubular boss 6 whose interior is threaded and has fitted therein the set-screw 7 which engages with the threads of said boss and has its point portion adapted to contact with the adjacent portion of the handle bar, it being noticed that when said set screw is loosened the handle bar may be turned up or down to a required extent of vertical adjustment after which said set screw is tightened against the handle bar thus holding the latter firmly in its adjusted position, and preventing it from turning or shifting in the head, the device being effective, practical, strong, durable and inexpensive in its nature.

Attention is drawn to the fact that the head 3 and neck 4 form together a T-head which are integral and excepting the openings therein are solid in their nature without divisions or splits common in other constructions, and so the hold on the handle bar is occasioned by the screw or bolt 7 whose point or end is adapted to tighten against the portion of the side of said bar within the tubular head 3, it being noticed that the bore of the boss 6 is in communication with the bore of the said head 3 so that said portion of the bar when the latter is adjusted is gripped solidly by the wall of the bore of said head and the point or end of the screw or bolt, the said point or end being a continuity of the bore of said head 3.

The upper limb of the post or stem 5 is made drift-tight in the bore of the neck 4 and further secured by the pin 8 which is passed through said neck and limb and has its ends headed on the exterior of said neck after the manner of a rivet, thus making a strong connection.

The forward end of the tubular neck 4 is closed by a wall 9 on the rear portion of the tubular head 3, so that the forward terminal end of the upper portion of the post 5 is adapted to abut solidly against said wall and that portion is adapted to be positioned in said neck to the full length of said portion, said wall preventing any break in the neck forward of said end portion of the post, thus strengthening said neck at its rear portion and preventing the front end of the top portion of the post from abutting the central portion of the handle bar so that the latter does not contact with said end and grind thereagainst, especially in the turning adjustment of said handle bar.

The front face of said wall is curved to accord with the remainder of the inner wall of the tubular head 3, so that the portion of the handle bar within said head is completely surrounded by the circular wall of said head, excepting at the bore of the boss 6 which bore is occupied by the set screw or bolt 7 so that said point abuts solidly against the handle bar in the head, whereby there will be no lost motion of said bar in said boss, and no rattling of the bar in the head, and the handle bar when adjusted will be held by a vise-like grip of the inner circular wall of the head concentric with the handle bar.

Having thus described my invention what I claim as new and desire to secure by Letters Patent, is:—

1. In an adjustable handle bar of the character stated a tubular head, a tubular neck extending rearward thereof, a threaded boss on said head, and a set screw in said boss, said screw being adapted to abut solidly an adjacent portion of the surface of said handle bar.

2. In an adjustable handle bar of the character stated, a tubular head, a tubular neck extending rearward thereof, a threaded boss on said head, and a set screw in said boss, said screw being adapted to abut solidly an adjacent portion of the surface of said handle bar, said neck having in its front end a wall adapted to close the same forming an abutment for the corresponding forward end of the steering post of the vehicle and having its forward face concentric with the bore of said head and with the adjacent surface of the handle bar.

RICHARD G. LEDIG.

Witnesses:
JOHN A. WIEDERSHEIM,
N. BUSSINGER.

Copies of this patent may be obtained for five cents each, by addressing the "Commissioner of Patents, Washington, D. C."